United States Patent [19]
Thorstensen et al.

[11] Patent Number: 5,341,880
[45] Date of Patent: Aug. 30, 1994

[54] SAND SCREEN STRUCTURE WITH QUICK CONNECTION SECTION JOINTS THEREIN

[75] Inventors: Egil Thorstensen, Stavanger; Karluf Hagen, Randaberg, both of Norway

[73] Assignee: Halliburton Company, Houston, Tex.

[21] Appl. No.: 92,689

[22] Filed: Jul. 16, 1993

[51] Int. Cl.⁵ .............................................. E21B 43/00
[52] U.S. Cl. ...................................... 166/278; 166/51
[58] Field of Search .......................... 166/51, 276–278, 166/284, 285, 296

[56] References Cited

U.S. PATENT DOCUMENTS

| | | | |
|---|---|---|---|
| 1,874,035 | 8/1932 | Fletcher . | |
| 3,908,256 | 9/1975 | Smith, III | 29/163.5 |
| 3,958,634 | 5/1976 | Smith, III | 166/233 |
| 4,018,283 | 4/1977 | Watkins | 166/278 |
| 4,071,937 | 2/1978 | Röhlig | 29/420 |
| 4,088,580 | 5/1978 | Spurlock | 210/323 |
| 4,754,807 | 7/1988 | Lange | 166/236 |
| 4,821,800 | 4/1989 | Scott et al. | 166/228 |
| 4,951,750 | 8/1990 | Wetzel, Jr. | 166/278 |
| 5,004,049 | 4/1991 | Arterbury | 166/228 |
| 5,088,554 | 2/1992 | Arterbury et al. | 166/228 |
| 5,190,102 | 3/1993 | Arterbury et al. | 166/228 |

*Primary Examiner*—Thuy M. Bui
*Attorney, Agent, or Firm*—Tracy W. Druce; J. Richard Konneker

[57] ABSTRACT

A sand screen structure used to filter particulate matter from formation fluid entering a well bore is assembled from a plurality of generally tubular filter sections that may be axially snapped together in a manner facilitating the simultaneous interconnection of circumferentially spaced series of axially extending shunt tubes secured to and passing internally through each of the filter sections. By utilizing snap-fit interconnections between the filter sections, instead of conventional threaded connections, the assembly of the overall sand screen structure is made substantially easier and quicker, and the lengths of the blank, nonfiltering portions of the sand screen structure between its individual filter sections are substantially reduced. In an alternate embodiment of the sand screen structure the shunt tubes are secured within external side surface recesses of the filter section bodies.

17 Claims, 2 Drawing Sheets

SAND SCREEN STRUCTURE WITH QUICK CONNECTION SECTION JOINTS THEREIN

BACKGROUND OF THE INVENTION

The present invention generally relates to apparatus for completing downhole wells, and more particularly relates to sand screen apparatus for filtering particulate matter out of formation fluid entering the well bore to be flowed upwardly through the well flow conductor.

In the course of completing an oil and/or gas well, it is common practice to run a string of protective casing into the well bore and then to run the production tubing inside the casing. At the well site, the casing is perforated across one or more production zones to allow production fluids to enter the casing bore. During production of the formation fluid, formation sand is also swept into the flow path. The formation sand is relatively fine sand that tends to erode production components in the flow path.

In some completions, the well bore is uncased, and an open face is established across the oil or gas bearing zone. Such open bore hole (uncased) arrangements are utilized, for example, in water wells, test wells and horizontal well completions.

One or more sand screens are typically installed in the flow path between the production tubing and the perforated casing (cased) or the open well bore face (uncased). A packer is customarily set above the sand screen to seal off the annulus in the zone where production fluids flow into the production tubing. The annulus around the screen is packed with a relatively coarse sand (or gravel) which acts as a filter to reduce the amount of fine formation sand reaching the screen. A work string and service seal unit (SSU) is used to spot the packing sand around the screen.

During well completion, packing sand or gravel is also pumped and squeezed into the producing formation around the screen for filtering unconsolidated material out of the inflowing well fluid. The packing sand is pumped down the work string in a slurry of water or gel and is spotted directly under the packer or above the sand screen. The packing sand also fills the annulus between the sand screen and the well casing. In well installations in which the screen is suspended in an uncased open bore, the sand or gravel pack supports the surrounding unconsolidated formation.

Sand screen structures are typically constructed, prior to their operative placement in a well bore, from a plurality of generally tubular axial filter sections disposed in an end-to-end orientation in which facing end portions of each axially adjacent filter section pair are threadingly secured to a connection collar member interposed between the two filter sections. After the assembled multi-section sand screen structure is coaxially placed in the well bore, the packing sand/gel slurry is forced down the well bore/sand screen annulus to form, in effect, a prefiltering barrier around the sand screen to inhibit the entry thereinto of fine formation sand.

A problem potentially encountered in this sand packing process is the formation around the sand screen of annular sand "bridges" that may prevent the complete circumscribing of the screen structure with packing sand in the completed well. This incomplete screen structure coverage by the packing sand, of course, leaves an axial portion of the sand screen exposed to the fine formation sand, thereby undesirably lowering the overall filtering efficiency of the overall sand screen structure.

One conventional approach to overcoming this packing sand bridging problem has been to provide each generally tubular filter section with a circumferentially spaced series of open-ended shunt tubes that longitudinally extend axially through the interior of the filter section, with opposite ends of each shunt tube projecting outwardly beyond the active filter portion of the filter section. In the assembled sand screen structure the shunt tube series are axially joined to one another and form a shunt path extending along the entire length of the sand screen structure and operative to permit the inflowing packing sand/gel slurry to bypass any sand bridges that may be formed and permit the slurry to enter the screen/casing annulus beneath a sand bridge and form the desired sand pack beneath it.

This conventional solution to sand bridging, however, carries with it several well known problems, limitations and disadvantages. For example, the use of thread joints to interconnect each axially adjacent pair of filter sections often makes it difficult to circumferentially align each pair of shunt tube series that must be interconnected to maintain axial continuity in the overall shunt flow path. Additionally, a supplemental connection fitting, interposed between the facing ends of each axially adjacent pair of shunt tube series, must be used to interconnect and operatively communicate the interiors of the shunt tube series.

This conventional necessity, coupled with the requirement of using a connection collar to couple the bodies of each adjacent pair of filter sections, tends to make the assembly of the overall sand structure relatively difficult and time consuming. Moreover, the necessity of using these two connection fittings between each axially adjacent pair of filter sections increases the "blank" spaces between the active filter portions of the filter sections. This, in turn, undesirably reduces the filtration capacity per length of the assembled sand screen structure.

It can readily be seen from the foregoing that a need exists for a multi-section sand screen structure that eliminates or at least substantially reduces the above-mentioned problems, limitations and disadvantages commonly associated with conventional sand screen structures of the general type described. It is accordingly an object of the present invention to provide such a sand screen structure and associated assembly methods therefor.

SUMMARY OF THE INVENTION

In carrying out principles of the present invention, in accordance with a preferred embodiment thereof, a sand screen structure is provided for separating particulate material from formation fluid entering a well bore. The sand screen structure comprises a plurality of generally tubular axial filter sections coaxially disposed in an end-to-end orientation, with facing end portions of each axially adjacent pair of filter sections being in a telescoped relationship. Cooperating means on each pair of telescoped end portions releasably joining them in an axially snap-fitted relationship, the cooperating means being operative to substantially preclude relative axial and rotational movement between each telescoped pair of filter section end portions.

Preferably, each filter section has secured thereto a circumferentially spaced series of axially extending shunt tubes. In one embodiment of the sand screen structure the shunt tubes pass interiorly through the body of each filter section, and in another embodiment of the sand screen structure the shunt tubes are secured within exterior surface grooves formed on the filter section bodies.

In assembling the sand screen structure each axially adjacent pair of filter sections are aligned in a manner circumferentially aligning their shunt tube series, and are then simply axially snapped together to simultaneously connect opposing ends of their associated shunt tube series in a telescoped relationship.

Compared to the conventional method of securing the filter sections to one another by threading their opposing ends into a connection collar, and utilizing an additional connection fitting to operatively connect and communicate the interiors of the shunt tubes, the structure and method of the present invention permits the sand screen structure to be more easily and quickly fabricated and, in the assembled sand screen structure, advantageously reduces the blank, nonfiltering spaces between the interconnected filter sections.

DETAILED DESCRIPTION

Figure 1:
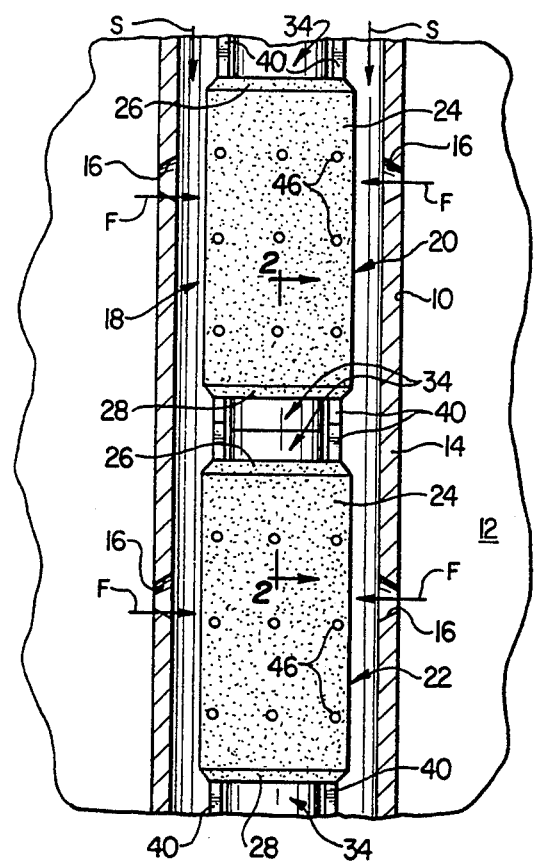
FIG. 1 is a simplified cross-sectional view through a subterranean well casing and illustrates, in elevation, a longitudinal portion of a specially designed sand screen structure embodying principles of the present invention and operative to filter particulate matter out of formation fluid entering the casing and upwardly traversing the interior of the screen structure.

Illustrated in simplified form in FIG. 1 is a portion of a representative subterranean well in which a well bore 10 extends through a production fluid bearing formation 12. Well bore 10 is lined with the usual tubular casing 14 having perforations 16 formed therein through which formation fluid F may inwardly flow for delivery to the surface through a production tubing string (not shown) disposed within a portion of the casing 14 above the casing portion shown in FIG. 1.

To filter out particulate matter, such as fine sand, from the formation fluid F entering the casing 14 through its perforations 16, a specially designed sand screen structure 18 embodying principles of the present invention is operatively placed within the casing 14. In a manner subsequently described, the sand screen structure 18 is assembled from a plurality of generally tubular filter sections releasably connected in an end-to-end manner to the lower end of the production tubing string. Two representative filter sections 20 and 22, of identical construction and releasably connected in an end-to-end manner, are shown in FIG. 1.

Figure 2A:
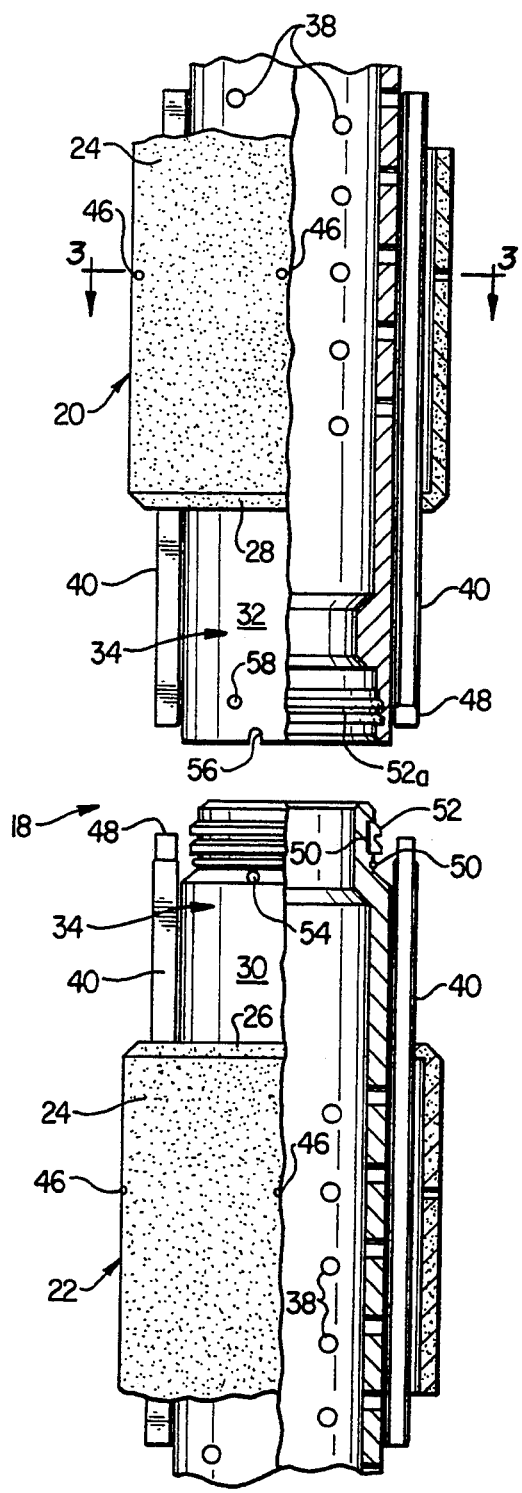
FIGS. 2A and 2B are enlarged scale quarter cross-sectional views through the screen structure, taken generally along line 2—2 of FIG. 1, and sequentially illustrate the snap-together joining of two axially adjacent filter section portions of the screen structure.
Figure 2B:
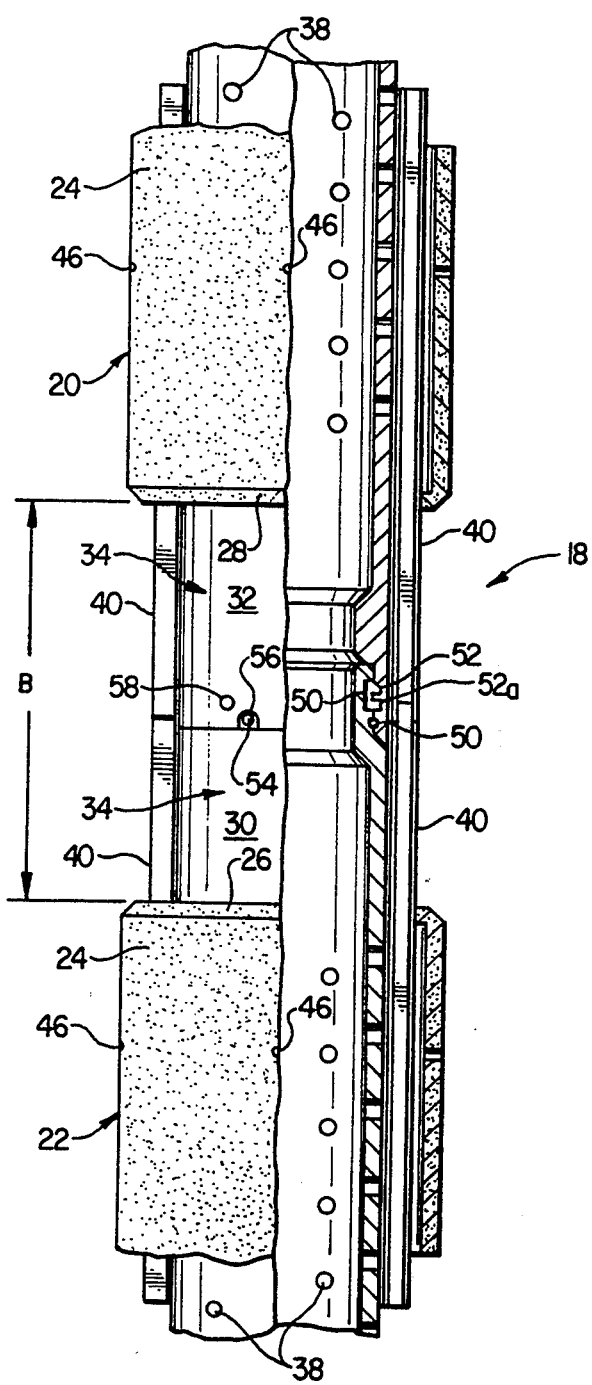

Referring now to FIGS. 1, 2A and 2B, each of the filter sections 20 and 22 includes a fluid-porous, particulate restricting tubular outer body member 24 formed from a sintered metal material. Each body member 24 has annular, inturned upper and lower ends 26 and 28. Extending coaxially through each of the outer body members 24, and having upper and lower end portions 30 and 32 projecting outwardly beyond the upper and lower ends 26,28 of the body member 24, is an open-ended mandrel 34. Mandrel 34 forms within the interior of the outer body 24 a pre-pack annulus 36 (see FIG. 3), and is appropriately sealed at the upper and lower ends 26,28 of the outer body member 24. The axial portion of the mandrel 34 within the outer body member 24 has a spaced series of perforations 38 extending radially therethrough as best illustrated in FIGS. 2A and 2B.

Figure 3:
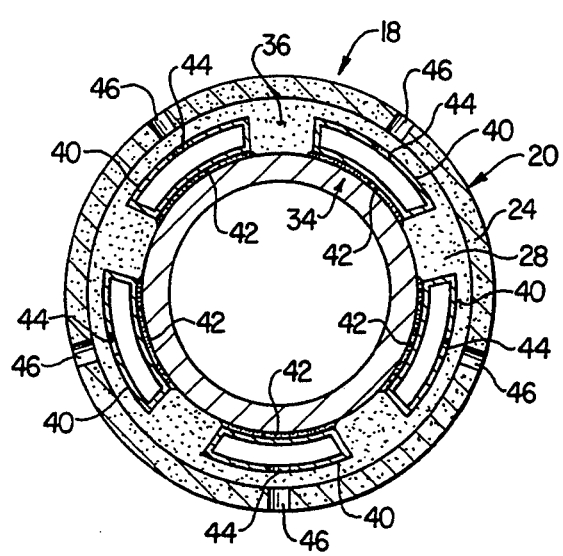
FIG. 3 is an enlarged scale cross-sectional view through one of the filter sections taken along line 3—3 of FIG. 2A.

In a generally conventional manner, circumferentially spaced series of open-ended shunt tubes 40 axially extend along the lengths of the filter sections 20,22. Shunt tubes 40 pass through the interiors of the outer bodies 24 and project outwardly beyond their upper and lower ends 26 and 28. As best illustrated in FIG. 3, the shunt tubes 40 are welded as at 42 to the outer side surface of their associated mandrel 34 within the interior of the outer body 24, and are appropriately sealed to the upper and lower ends 26,28 of the outer body 24. The portions of the shunt tubes 40 within the outer bodies 24 have perforations 44 (see FIG. 3), the perforations 44 being circumferentially aligned with series of perforations 46 formed in the side walls of the outer bodies 24.

The upper or pin end 30 of the mandrel 34 of filter section 22 is axially insertable into the lower or box end 32 of the mandrel 34 of filter section 20. According to a key aspect of the present invention these telescopable pin and box ends of the mandrels are configured to provide a releasably snap-fitted relationship between the pin and box ends in response to axial insertion of the pin end into the box end. This advantageously permits the facing ends of the two shunt tube series to be circumferentially aligned with one another prior to the snap-fitted engagement between their associated mandrels, and then be operatively telescoped with one another in response to such snap-fitted mandrel interengagement.

Appropriate seal structures 48 on the facing shunt tube ends (see FIG. 2A) automatically seal the telescoped shunt tube ends. Accordingly, when all of the generally tubular filter sections of the overall sand screen structure 18 are axially snap-fitted together in an end-to-end orientation, the axially interconnected shunt tubes form continuous sand pack bypass passages along the length of the assembled sand screen structure 18.

Because the filter sections 20,22 may be axially snapped together, as opposed to having to be threaded into a connection collar interposed between the filter sections as in conventional multi-section sand screen assembly practice, the axial "blank", nonfiltering sections B (see FIG. 2B) between axially adjacent pairs of the outer bodies 24 are substantially reduced. This, in turn, appreciably increases the filtering efficiency of the overall sand screen structure 18. Additionally, since the shunt tube series are automatically connected to one another in response to the snap-fitted engagement of their associated mandrels, the previous necessity of connecting the shunt tubes of axially adjacent filter sections with a separate connection fittings, the assembly of the sand screen structure 18 is made substantially easier and quicker.

Referring now to FIGS. 2A and 2B, the cooperating means on the pin and box ends 30 and 32 of the illustrated pair of mandrels 24 which permit them to be axially snap-fitted together to provide the aforementioned sand screen assembly advantages are representatively shown as being of the conventional type used to axially interconnect larger tubular well members such as casing sections. However, as will be appreciated by those of skill in this particular art, a variety of other releasable snap-fit configurations could be alternatively utilized if desired.

As can be best seen in FIG. 2A, the pin end 30 of the lower mandrel 34 has a reduced diameter portion at its upper end, and an annular exterior groove 50 is formed in the reduced diameter portion above an O-ring sealing member externally carried thereon. A split locking ring member 52, having a ramped and grooved outer side surface profile as indicated, is captively retained in the groove 50 and lockingly snaps into a complementarily configured interior side surface groove 52a in the box end 32 when the pin end 30 is axially inserted into the box end 32 with the lower shunt tubes 40 in circumferential alignment with the upper shunt tubes 40 as previously described.

This snap-together axial interconnection between the pin and box ends of the upper and lower mandrels 34 axially locks the illustrated filter sections 20,22 together. Relative rotation between the interconnected filter sections 20,22 is prevented by the receipt of an anti-rotation bolt 54 externally secured to the pin section of the lower mandrel 34 and received in a corresponding end slot 56 formed in the box section of the upper mandrel 34. To uncouple the upper and lower mandrels 34 a circumferentially spaced series of unlocking bolts or screws 58 (only one of which is shown) are threaded into side wall openings in the mandrel box end 32 in axial alignment with the interior side surface groove 52a. When it is desired to uncouple the filter sections 20 and 22 the screws 58 are simply advanced against the locking ring 52 to radially compress it into its associated groove 50, thereby permitting the pin and box ends 30,32 to be axially separated from one another.

Referring again to FIG. 1, after the assembled screen structure 18 is installed in the casing 14, a packing sand/gel slurry S is forced downwardly into the annulus between the casing and the sand screen to form the pre-filtering sand pack around the screen structure. In the event that an annular sand bridge is created externally around the sand screen structure, the slurry is caused to bypass the sand bridge by flowing into the shunt tubes, via the openings 46 and 44, downwardly through the shunt tubes, and then outwardly into the casing/sand screen annulus beneath the sand bridge via openings 44 and 46.

While the present invention has been representatively illustrated using filter sections that have shunt tubes incorporated therein, it will be appreciated that the sand screen structure could also be assembled using filter sections having the previously described cooperating snap-lock connecting means thereon, but not the shunt tubes. For example, the invention could be incorporated in sand filter structures as shown in U.S. Pat. Nos. 3,908,256; 5,004,049; 5,088,554 and 5,190,102. This would still provide the advantages of easier and quicker sand screen assembly, and would also reduce the lengths of the "blank" sections of the sand screen structure between its interconnected filter sections.

Figure 3A:
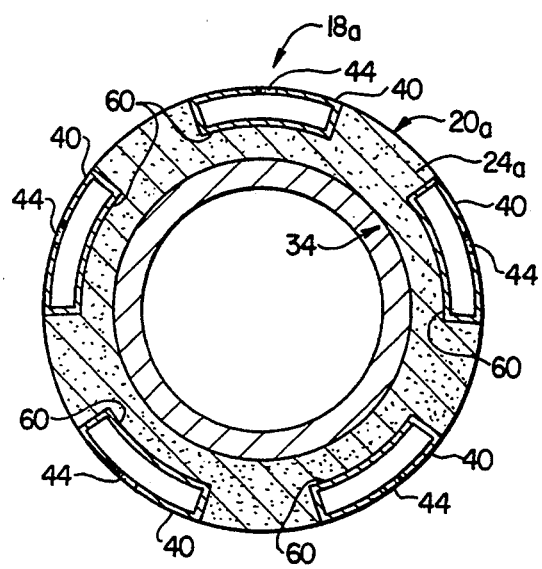
FIG. 3A is an enlarged scale cross-sectional view similar to that in FIG. 3 but cross-sectionally illustrating an alternate embodiment of the sand screen structure.

A modified filter section 20a of an alternate embodiment 18a of the previously described sand screen structure 18 is cross-sectionally depicted in FIG. 3A. The filter section 20a, like the other filter sections in the sand screen structure 18a, has a tubular, sintered metal outer body portion 24a whose interior side surface is contiguous with the outer side surface of the mandrel 34. The shunt tubes 40 are received in complementarily cross-sectioned axial grooves 60 formed in the outer side surface of the outer body portion 24a, with the upper and lower ends of the shunt tubes 40 extending past the upper and lower ends of the outer body portion 24a. The mandrel portions of the filter sections of the sand screen 18a are configured identically to those in the sand screen 18, and are axially connectable to one another in a snap-lock fashion simultaneously and operatively interconnecting their associated shunt tubes.

The foregoing detailed description is to be clearly understood as being given by way of illustration and example only, the spirit and scope of the present invention being limited solely by the appended claims.

What is claimed is:

1. A sand screen structure for separating particulate material from formation fluid in a well, comprising:
    a plurality of generally tubular axial filter sections coaxially disposed in an end-to-end orientation, with facing end portions of each axially adjacent pair of said filter sections being in a telescoped relationship; and
    cooperating means on each pair of telescoped end portions for releasably joining them in an axially snap-fitted relationship, said cooperating means being operative to substantially preclude relative axial and rotational movement between each telescoped pair of said end portions.

2. The sand screen structure of claim 1 wherein each of said filter sections includes:
    a perforated tubular mandrel having opposite end portions, and
    a porous tubular outer body member outwardly circumscribing said mandrel and having opposite end portions axially inset from said opposite end portions of said mandrel.

3. The sand screen structure of claim 2 wherein:
    said cooperating means are disposed on said opposite end portions of said mandrels.

4. A method of assembling a sand screen structure useable to separate particulate material from formation fluid in a well, said method comprising the steps of:
    providing first and second generally tubular filter sections each having an end portion;
    axially inserting said end portion of said first filter section into said end portion of said second filter section to a telescoped relationship therewith; and
    creating, in response to the performance of said axially inserting step, an axially releasable, snap-locked relationship between the telescoped end portions in a manner substantially precluding relative axial and rotational movement therebetween.

5. The method of claim 4 wherein:
    each of said first and second filter sections includes a perforated tubular mandrel having opposite end portions, and a porous tubular outer body member outwardly circumscribing said mandrel and having opposite end portions axially inset from said opposite end portions of said mandrel, and
    said axially inserting step includes the step of axially inserting an end portion of one of said mandrels into an end portion of the other of said mandrels.

6. The method of claim 5 wherein:

said method further comprises the steps of coaxially mounting a split locking ring externally on an end portion of one of said mandrels, and forming an interior side surface groove on an end portion of the other of said mandrels, and said creating step includes the step of causing said locking ring to snap into said groove.

7. The method of claim 6 wherein:

said method further includes the step of forming an anti-rotation projection on an end portion of one of said mandrels, and an axial end slot on an end portion of the other of said mandrels, and said creating step further includes the step of causing said anti-rotation projection to enter said end slot.

8. A sand screen structure for separating particulate material from formation fluid in a well, comprising:

a plurality of generally tubular axial filter sections coaxially disposed in an end-to-end orientation, with facing end portions of each axially adjacent pair of said filter sections being in a telescoped relationship;

a circumferentially spaced series of axially extending shunt tubes carried on each of said filter sections, the shunt tubes on one of each axially adjacent pair of said filter sections being telescopingly engaged with the shunt tubes on the other filter section; and cooperating means on each pair of telescoped filter section end portions for releasably joining them in an axially snap-fitted relationship, said cooperating means being operative to substantially preclude relative axial and rotational movement between each telescoped pair of said end portions.

9. The sand screen structure of claim 8 wherein each of said filter sections includes:

a perforated tubular mandrel having opposite end portions, and a porous tubular outer body member outwardly circumscribing said mandrel and having opposite end portions axially inset from said opposite end portions of said mandrel.

10. The sand screen structure of claim 9 wherein:

said cooperating means are disposed on said opposite end portions of said mandrels.

11. The sand screen structure of claim 10 wherein:

the outer body member of each filter section defines with its associated mandrel a packing annulus within the outer body member, and said shunt tubes extend through the packing annulus of their associated outer body member.

12. The sand screen structure of claim 10 wherein:

said shunt tubes are externally carried on their associated outer body member.

13. A method of assembling a sand screen structure useable to separate particulate material from formation fluid in a well, said method comprising the steps of:

providing first and second generally tubular filter sections each having an end portion, each of said filter sections having thereon a circumferentially spaced series of axially extending shunt tubes;

axially inserting said end portion of said first filter section into said end portion of said second filter section, to a telescoped relationship therewith, in a manner bringing the two series of shunt tubes into a telescoped relationship with one another; and creating, in response to the performance of said axially inserting step, an axially releasable, snap-locked relationship between the telescoped filter section end portions in a manner substantially precluding relative axial and rotational movement therebetween.

14. The method of claim 13 wherein:

each of said first and second filter sections includes a perforated tubular mandrel having opposite end portions, and a porous tubular outer body member outwardly circumscribing said mandrel and having opposite end portions axially inset from said opposite end portions of said mandrel, and said axially inserting step includes the step of axially inserting an end portion of one of said mandrels into an end portion of the other of said mandrels.

15. The method of claim 14 wherein:

said method further comprises the steps of coaxially mounting a split locking ring externally on an end portion of one of said mandrels, and forming an interior side surface groove on an end portion of the other of said mandrels, and said creating step includes the step of causing said locking ring to snap into said groove.

16. The method of claim 15 wherein:

said method further includes the step of forming an anti-rotation projection on an end portion of one of said mandrels, and an axial end slot on an end portion of the other of said mandrels, and said creating step further includes the step of causing said anti-rotation projection to enter said end slot.

17. A sand screen structure for separating particulate material from formation fluid in a well, comprising:

first and second generally tubular axial filter sections coaxially disposed in an end-to-end orientation, with facing end portions of said first and second filter sections being in a telescoped relationship, said first and second filter sections having exterior side portions;

first and second circumferentially spaced series of axially extending shunt tubes respectively embedded in said exterior side portions of said first and second filter sections, said first and second series of shunt tubes being in a telescoped relationship with one another; and cooperating means on each pair of telescoped end portions for releasably joining them in an axially snap-fitted relationship.

* * * * *